United States Patent
Kummer et al.

(10) Patent No.: US 10,619,678 B2
(45) Date of Patent: Apr. 14, 2020

(54) UNIVERSAL JOINT

(71) Applicant: Ulterra Drilling Technologies, L.P., Fort Worth, TX (US)

(72) Inventors: Nikolai Kummer, Edmonton (CA); Beau J. St. Pierre, Hudson Oaks, TX (US); Jason Maw, Beaumont (CA)

(73) Assignee: Ulterra Drilling Technologies, L.P., Fort Worth, TX (US)

( * ) Notice: Subject to any disclaimer, the term of this patent is extended or adjusted under 35 U.S.C. 154(b) by 0 days.

(21) Appl. No.: 15/160,809

(22) Filed: May 20, 2016

(65) Prior Publication Data

US 2016/0341255 A1 Nov. 24, 2016

Related U.S. Application Data

(60) Provisional application No. 62/165,540, filed on May 22, 2015.

(51) Int. Cl.
| | | |
|---|---|---|
| *F16D 3/79* | (2006.01) | |
| *E21B 4/00* | (2006.01) | |
| *E21B 17/03* | (2006.01) | |

(52) U.S. Cl.
CPC .............. *F16D 3/79* (2013.01); *E21B 4/006* (2013.01); *E21B 17/03* (2013.01)

(58) Field of Classification Search
CPC ..... E21B 17/042; E21B 17/05; F16D 3/76–79
USPC ........................................ 464/19–21, 78, 79
See application file for complete search history.

(56) References Cited

U.S. PATENT DOCUMENTS

| 763,127 | A | | 6/1904 | Tilden |
| 1,155,629 | A | | 10/1915 | Turon |
| 1,261,962 | A | | 4/1918 | Scott |
| 1,314,990 | A | * | 9/1919 | Stockwell ................. F16D 3/78 |
| | | | | 464/99 |
| 1,324,063 | A | | 12/1919 | Noel |
| 1,337,646 | A | | 4/1920 | Eckart |

(Continued)

FOREIGN PATENT DOCUMENTS

| CH | 241255 | 2/1946 |
| DE | 163221 | 9/1905 |

(Continued)

OTHER PUBLICATIONS

Final Office Action received from the U.S. Patent and Trademark Office in U.S. Appl. No. 14/838,155, dated Jul. 5, 2017, 7 pages.

(Continued)

*Primary Examiner* — Josh Skroupa
(74) *Attorney, Agent, or Firm* — Kilpatrick Townsend & Stockton LLP

(57) ABSTRACT

A universal joint assembled to a drill string transfers torque between two components where rotation of the components may not be completely aligned. The universal joint includes upper and lower longitudinal members each connected to opposite sides of a bearing element. The elements are connected to the bearing element at spaced radial positions. As the joint rotates the bearing element flexes between the connections to accommodate misalignment of the elements. Axial force can be transferred through the bearing element as well as torque.

24 Claims, 6 Drawing Sheets

(56) References Cited

U.S. PATENT DOCUMENTS

| | | | |
|---|---|---|---|
| 1,355,516 A * | 10/1920 | Rodolphe | F16D 3/78 464/99 |
| 1,362,646 A * | 12/1920 | Stockwellan | F16D 3/78 464/95 |
| 1,369,349 A | 2/1921 | Murphy | |
| 1,373,393 A | 3/1921 | Langworthy | |
| 1,376,504 A * | 5/1921 | Behn | F16D 3/78 464/95 |
| 1,421,072 A | 6/1922 | Emet | |
| 1,422,339 A * | 7/1922 | Church | F16D 3/78 464/170 |
| 1,460,594 A * | 7/1923 | Le Moon | F16D 3/78 464/95 |
| 1,479,755 A * | 1/1924 | Stokes | F16D 3/78 464/94 |
| 1,488,291 A * | 3/1924 | Schell | F16D 3/78 464/7 |
| 1,550,458 A * | 8/1925 | Schell | F16D 3/78 464/99 |
| 1,647,240 A | 11/1927 | Mcdonald | |
| 1,653,995 A | 12/1927 | English | |
| 1,739,756 A | 12/1929 | Granville | |
| 1,897,542 A | 2/1933 | West | |
| 1,950,448 A | 3/1934 | Heisterkamp | |
| 1,956,733 A | 5/1934 | Small | |
| 1,960,092 A | 5/1934 | Taylor | |
| 2,025,825 A | 12/1935 | Louis | |
| 2,217,969 A | 10/1940 | Schairer | |
| 2,301,659 A | 11/1942 | Louis | |
| 2,319,027 A * | 5/1943 | Aker | F16D 3/78 464/7 |
| 2,491,820 A | 12/1949 | Leibing et al. | |
| 2,647,380 A * | 8/1953 | Henry | F16D 3/72 464/99 |
| 2,696,719 A | 12/1954 | Sklar | |
| 2,787,328 A | 4/1957 | Atkinson | |
| 3,000,198 A | 9/1961 | Stout | |
| 3,118,159 A | 1/1964 | Kollman | |
| 3,203,285 A | 8/1965 | Schimidt | |
| 3,347,061 A | 10/1967 | Stuemky | |
| 3,446,297 A | 5/1969 | Cullen et al. | |
| 3,497,083 A | 2/1970 | Anderson et al. | |
| 3,587,740 A | 5/1971 | Gerwick et al. | |
| 3,757,879 A | 9/1973 | Wilder et al. | |
| 3,895,502 A | 7/1975 | Schwarz | |
| 4,055,966 A * | 11/1977 | Fredericks | F16D 3/79 464/99 |
| 4,233,820 A | 11/1980 | Driver | |
| 4,449,956 A | 5/1984 | Ueno | |
| 4,487,591 A | 12/1984 | Berg | |
| 4,706,659 A | 11/1987 | Matthews et al. | |
| 4,720,114 A | 1/1988 | Braitmaier et al. | |
| 4,917,653 A | 4/1990 | Collucci | |
| 4,947,942 A | 8/1990 | Lightle et al. | |
| 4,982,801 A | 1/1991 | Zitka et al. | |
| 5,000,723 A | 3/1991 | Livingstone | |
| 5,019,015 A * | 5/1991 | Wasserfuhr | F16D 3/79 464/99 |
| 5,048,622 A | 9/1991 | Ide | |
| 5,053,687 A | 10/1991 | Merlet | |
| 5,186,686 A | 2/1993 | Staples et al. | |
| 5,330,388 A | 7/1994 | Blanding | |
| 5,392,664 A | 2/1995 | Gogins | |
| 5,651,737 A | 7/1997 | Blanc | |
| 5,740,699 A | 4/1998 | Ballantyne et al. | |
| 6,155,349 A | 12/2000 | Robertson et al. | |
| 6,173,794 B1 | 1/2001 | Von Gynz-rekowski et al. | |
| 6,220,372 B1 | 4/2001 | Cherry | |
| 6,415,735 B1 | 7/2002 | Rogers | |
| 6,676,526 B1 * | 1/2004 | Poster | B64C 27/12 464/99 |
| 6,896,473 B2 | 5/2005 | Schuler | |
| 7,004,843 B1 | 2/2006 | Kerstetter | |
| 7,100,238 B2 | 9/2006 | McCauley | |
| 7,367,772 B2 | 5/2008 | Khajepour et al. | |
| 7,549,467 B2 | 6/2009 | Mcdonald et al. | |
| 8,123,644 B2 | 2/2012 | Marumoto | |
| 8,251,938 B1 | 8/2012 | Morcuende et al. | |
| 8,317,628 B2 * | 11/2012 | Overfelt | F16D 3/79 29/428 |
| 8,602,127 B2 | 12/2013 | Hummes | |
| 8,714,245 B2 | 5/2014 | Sihler | |
| 10,221,894 B2 | 3/2019 | St. Pierre et al. | |
| 2011/0048710 A1 | 3/2011 | Robichaux et al. | |
| 2011/0129375 A1 | 6/2011 | Kotsonis | |
| 2011/0162891 A1 | 7/2011 | Camp | |
| 2014/0027185 A1 * | 1/2014 | Menger | E21B 17/05 175/73 |
| 2014/0370995 A1 | 12/2014 | Collins et al. | |
| 2015/0075871 A1 | 3/2015 | Strittmatter | |
| 2015/0129311 A1 | 5/2015 | Regener et al. | |
| 2016/0060970 A1 | 3/2016 | Pierre et al. | |
| 2016/0341255 A1 | 11/2016 | Kummer et al. | |
| 2016/0356319 A1 * | 12/2016 | Chase | F16D 3/78 |
| 2017/0002871 A1 | 1/2017 | McMillan et al. | |
| 2017/0023068 A1 | 1/2017 | Maw | |
| 2017/0081928 A1 | 3/2017 | Maw et al. | |
| 2017/0328416 A1 | 11/2017 | Maw et al. | |
| 2017/0370420 A1 | 12/2017 | Deen et al. | |
| 2018/0371839 A1 | 12/2018 | Sonar et al. | |

FOREIGN PATENT DOCUMENTS

| | | |
|---|---|---|
| DE | 2730486 A1 | 1/1979 |
| EP | 0048564 A2 | 3/1982 |
| EP | 0048564 | 10/1982 |
| FR | 485872 A | 2/1918 |
| GB | 15259 | 8/1890 |
| GB | 189619223 | 8/1897 |
| RU | 2017930 C1 | 8/1994 |
| RU | 2526957 C1 | 8/2014 |
| SU | 700710 | 11/1979 |

OTHER PUBLICATIONS

International Search Report and Written Opinion received from the International Search Authority in Patent Cooperation Treaty Application No. PCT/US2015/047387, dated Dec. 10, 2015, 8 pages.

Non-Final Office Action received from the U.S. Patent and Trademark Office in U.S. Appl. No. 14/838,155, dated Feb. 17, 2017, 9 pages.

Restriction Requirement received from the U.S. Patent and Trademark Office in U.S. Appl. No. 14/838,155, dated Oct. 26, 2016, 7 pages.

Response to Restriction Requirement filed with the U.S. Patent and Trademark Office in U.S. Appl. No. 14/838,155, dated Jan. 26, 2017, 1 page.

Non-Final Office Action received from the U.S. Patent and Trademark Office in U.S. Appl. No. 15/195,892, dated Oct. 6, 2017, 9 pages.

Request for Continued Examination and Amendment filed with the U.S. Patent and Trademark Office in U.S. Appl. No. 14/838,155, dated Jan. 4, 2018, 9 pages.

Response to Non-Final Office Action filed with the U.S. Patent and Trademark Office in U.S. Appl. No. 14/838,155, dated Jun. 9, 2017, 6 pages.

U.S. Appl. No. 14/838,155, "Non-Final Office Action", dated Jun. 28, 2018, 6 pages.

U.S. Appl. No. 14/838,155, "Notice of Allowance", dated Nov. 1, 2018, 5 pages.

U.S. Appl. No. 14/838,155, "Notice of Allowance", dated Feb. 13, 2018, 6 pages.

U.S. Appl. No. 15/195,892, "Final Office Action", dated Jul. 12, 2018, 11 pages.

U.S. Appl. No. 15/195,892, "Notice of Allowance", dated Feb. 13, 2019, 6 pages.

U.S. Appl. No. 15/195,915, "Final Office Action", dated Mar. 12, 2019, 13 pages.

(56) References Cited

OTHER PUBLICATIONS

U.S. Appl. No. 15/195,915, "Non-Final Office Action", dated Jun. 11, 2018, 14 pages.
U.S. Appl. No. 15/268,618, "Non-Final Office Action", dated Aug. 24, 2018, 23 pages.
U.S. Appl. No. 15/268,618, "Notice of Allowance", dated Mar. 1, 2019, 8 pages.
U.S. Appl. No. 15/195,915 , "Non-Final Office Action", dated Jun. 5, 2019, 6 pages.
U.S. Appl. No. 15/636,469 , "Non-Final Office Action", dated May 20, 2019, 10 pages.
U.S. Appl. No. 15/195,915, "Notice of Allowance", dated Oct. 23, 2019, 7 pages.

* cited by examiner

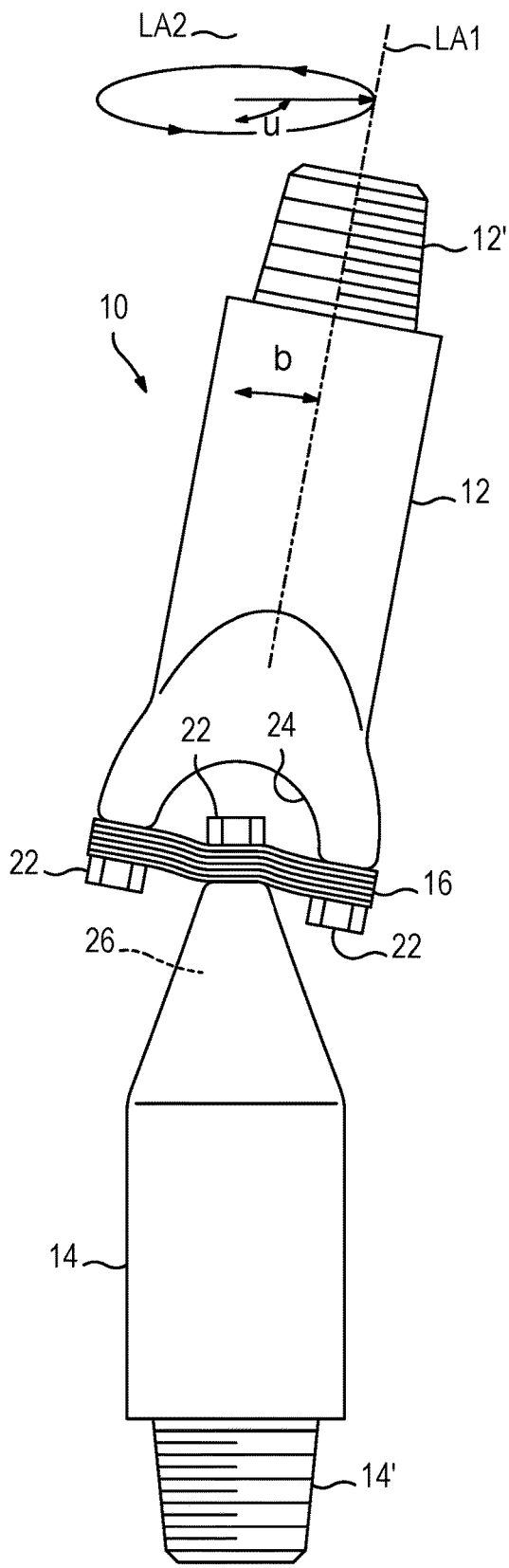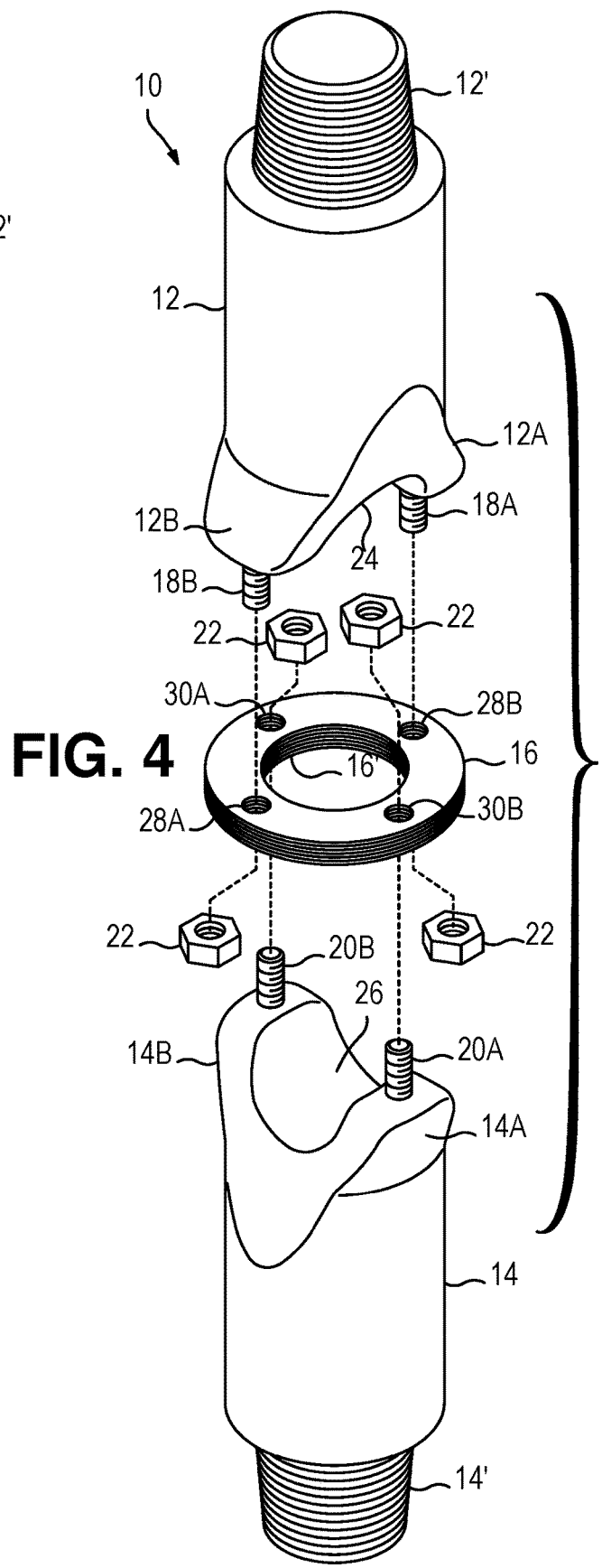

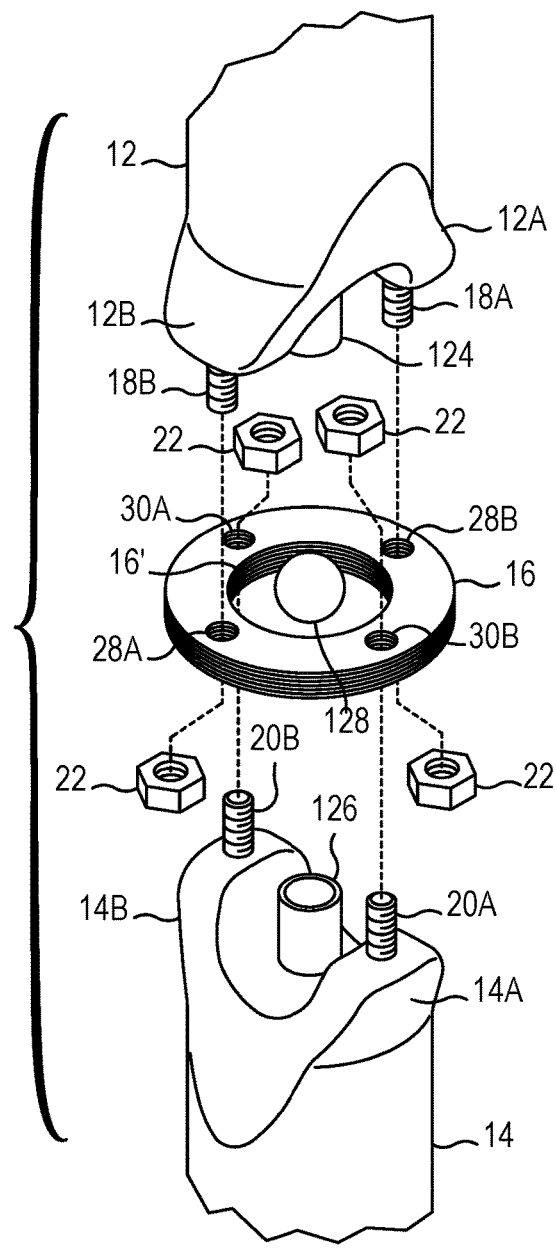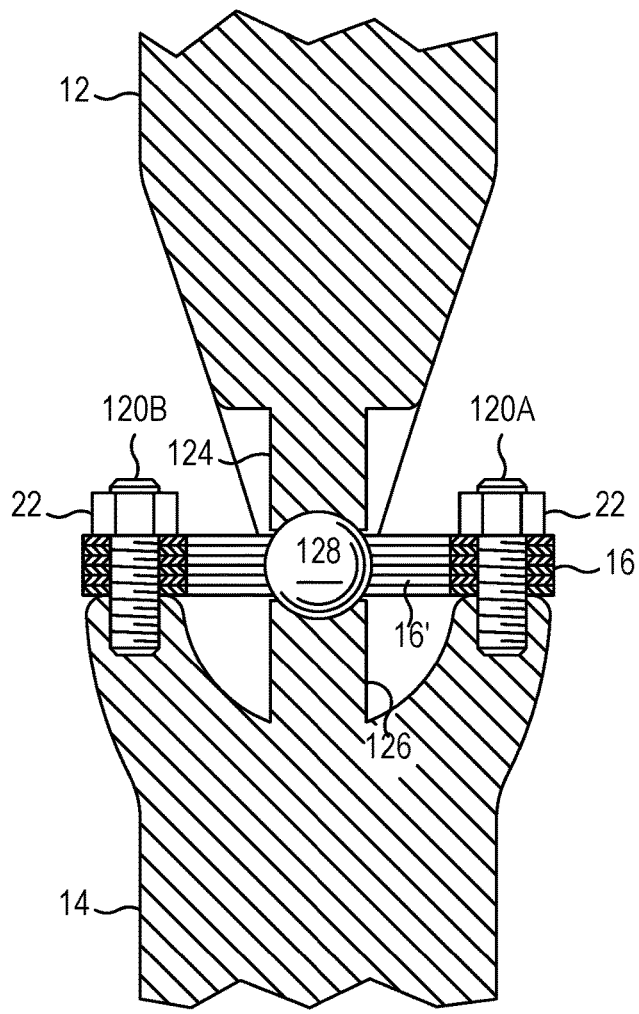
FIG. 5
FIG. 6

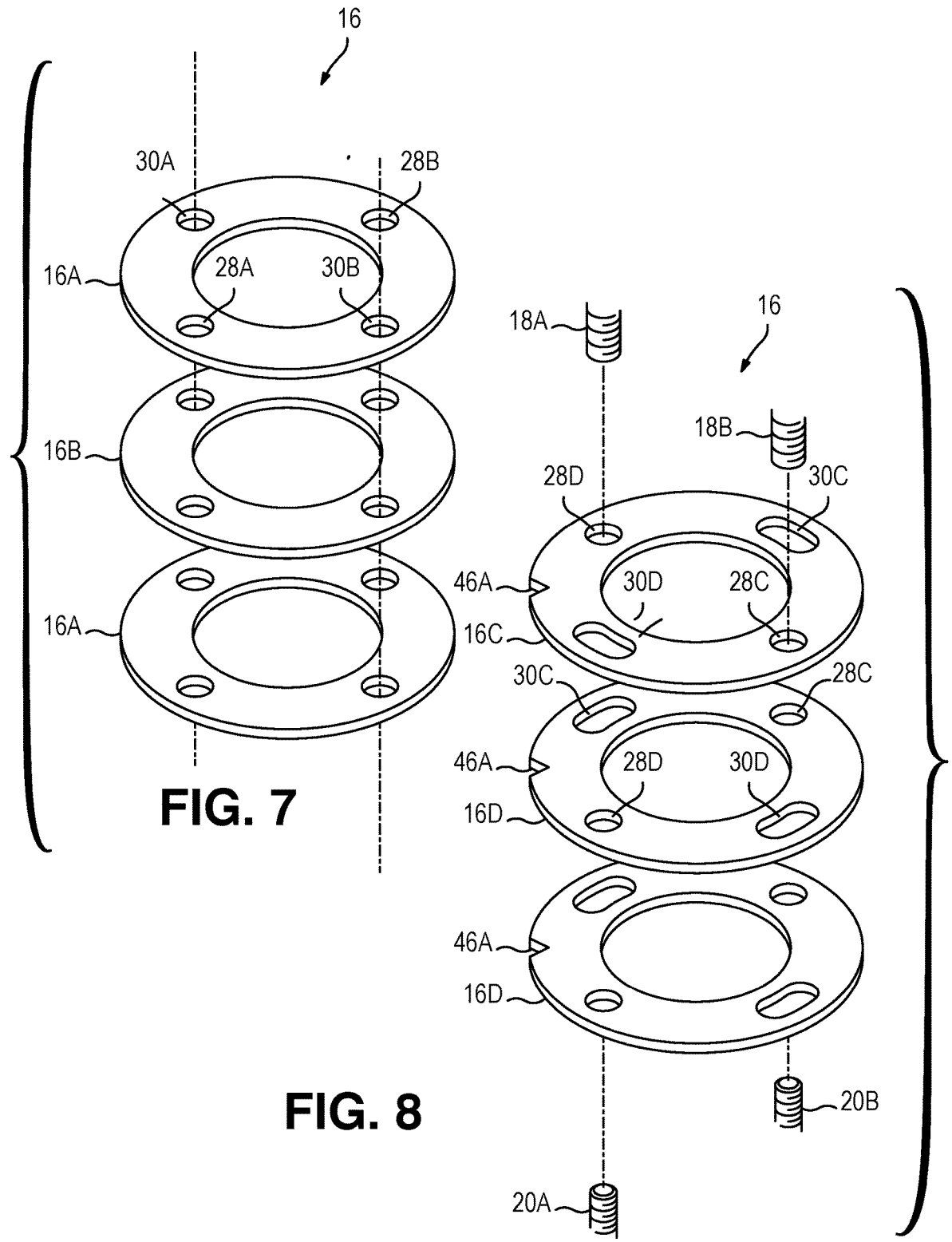

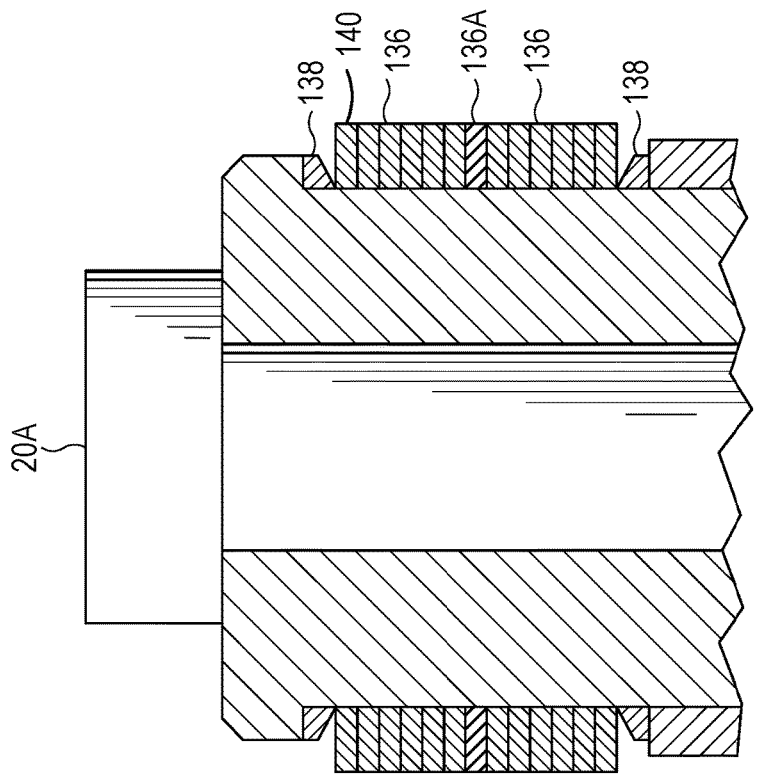
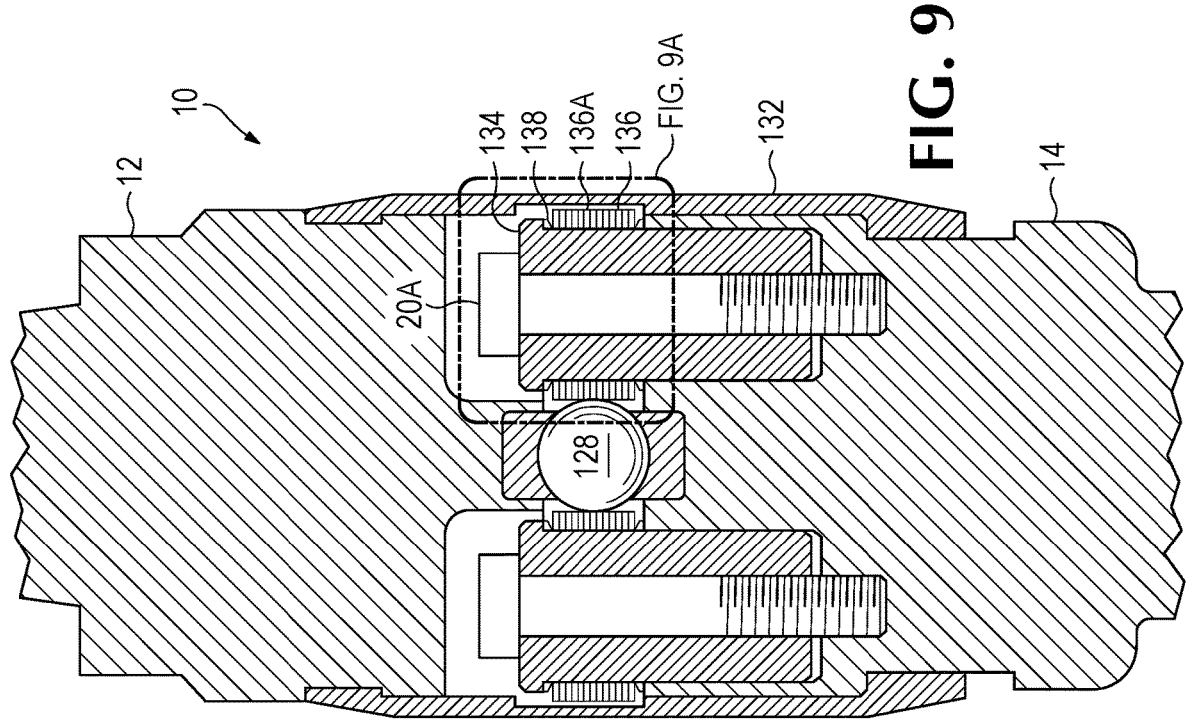
FIG. 9A
FIG. 9

UNIVERSAL JOINT

FIELD OF THE INVENTION

This invention relates to universal joints used in downhole drill strings.

BACKGROUND

Universal joints are used in mechanical applications to transmit torque between components where there can be misalignment of rotating parts. In a drilling operation, a drill bit is mounted to the end of a drill string. The drill bit is rotated from the top of the string or by a motor at the bottom of the string, or both, to advance the borehole. Universal joints are included in the drill string to accommodate rotational eccentricity. The eccentric rotation is converted into axial rotation in order for the drill bit to advance the borehole efficiently. Eccentricity can be initiated by a motor in the drive assembly that rotates the drill bit or by steering of the bit to change direction of the borehole.

FIG. 1 is a schematic representation of a drilling operation 2. In conventional drilling operations a drill bit 8 is mounted on the end of a drill string 6 comprising drill pipe and drill collars. The pipe sections of the drill string are threaded together at their ends to create a pipe of sufficient length to reach the bottom of the wellbore 4. A pump circulates drilling fluid through the drill pipe and out of the drill bit flushing rock cuttings from the bit and transporting them back up the wellbore. Additional tools 10 can be included in the drill string such as motors and vibrators.

The components of the drill string including the universal joint are subjected to extreme torque forces, elevated operating temperatures and abrasive drilling fluids, all of which can have an adverse effect on the operational life of drill string components. Constant relative movement of the components of a universal joint during operations, together with abrasive drilling mud, causes abrasion and erosion of mating components. Due to the constant relative movement of the components and aggressive downhole environment, they do not readily lend themselves to conventional sealing arrangements. Replacement of the joint or its components requires removal of the drill string from the borehole and downtime for the operation which increases operational expenses substantially.

SUMMARY OF THE INVENTION

The present invention pertains to a universal joint to be used as part of a downhole drill string. The joint can be advantageous by having limited moving parts, few components and/or being inexpensive to manufacture. In general, two connection members are each attached to a bearing element that flexes to provide relevant movement between the members. In one embodiment, a generally flat or planar bearing element is used. This configuration limits erosion that can occur with high normal force components with sliding or rotating contact surfaces. Using a flat bearing element can also provide a more compact assembly that allows the components of the drill string to be positioned closer together to shorten the drill string.

In one aspect of the present invention, a universal joint assembly for downhole application includes two axially extending members to connect to adjacent components of the drill string. Each member connects to a periphery of a bearing element at radially and angularly spaced positions for transmitting torque.

In another aspect of the invention, a downhole tool includes first and second bodies each with longitudinally extending arms at one end and a connector at the opposite end spaced from the arms. A bearing element is connected to the arms between the bodies with the arms at spaced radial positions.

In another aspect of the invention, an assembly to transfer torque between a mud motor and a bit includes two bodies that centrally contact opposite sides of an axial bearing element and are each secured to a torque bearing element radially and angularly spaced from the axial bearing element.

In another aspect of the invention, an assembly to transfer torque in a downhole drill string includes first and second bodies, correspondingly slotted at the ends to connect to a disk. The first and second bodies connect to the disk at spaced positions so a portion of the disk radially extends between connection positions of the bodies.

In another aspect of the invention, a service life indicator visible on the bearing element provides a gauge of wear, erosion and/or fatigue. In one embodiment, the indicator can include one or more disks incorporated in the bearing element of limited dimension or contrasting material properties in relation to adjacent components.

In another aspect of the invention, studs on adjacent arms of the joint assembly pass through slots in the bearing element at spaced positions, and over-torque of the joint is indicated by relative radial movement of the arms in the slots.

In another aspect of the invention, two bodies centrally contact opposite sides of an axial bearing element and are each secured to a torque bearing element. In another aspect of the invention, the torque bearing element is positioned about the axial bearing element. In one embodiment the axial bearing element is a ball and the torque bearing element is one or more disks.

In another aspect of the invention, the bearing element is used in conjunction with a positive displacement motor and/or a radial impulse tool. In another aspect of the invention, the connectors of the universal joint attach to adjacent tools of the drill string. In another aspect of the invention, the bearing element is used together with a ball bearing held between bearing seats of the upper and lower members to transfer axial loads through the joint. In another aspect of the invention, two bodies contact opposite sides of a ball of less than half the width of each body.

The various aspects mentioned above are provided as a brief reference to certain inventive features of the invention and are not intended to be exhaustive or essential. Each of the various aspects can be incorporated in a downhole universal joint on its own or collectively with one or more of the other aspects.

BRIEF DESCRIPTION OF THE DRAWINGS

FIG. 3 is a side elevation view of the joint of FIG. 2.
FIG. 4 is an exploded perspective view of the joint of FIG. 2.
FIG. 5 is an exploded perspective view of an inventive universal joint.
FIG. 6 is a cross section view of the universal joint of FIG. 5.
FIG. 7 is an exploded perspective view of a bearing element with a service life indicator.

FIG. 8 is an exploded perspective view of a bearing element with an overstress indicator.

FIG. 9 is a cross section view of a universal joint.

FIG. 9A is a detail of the universal joint of FIG. 9.

DETAILED DESCRIPTION OF THE PREFERRED EMBODIMENTS

A drill string in its basic form consists of sections of threaded pipe and tools assembled end to end with a drill bit at a distal end for advancing a borehole. The drill string can be miles long and rotated to turn the drill bit and advance the borehole. There are many different kinds of supplemental components that can be assembled to the drill string to perform a range of functions such as reaming out obstructions from the bore hole, widening the borehole or vibrating to limit friction between the string and the borehole.

Positive displacement or mud motors can be installed at the distal end of the drill string to drive the drill bit instead of, or in addition to, driving the drill string from the above ground drill rig. Fluid is pumped down the drill string during operation under pressure to flush material out of the borehole. A mud motor uses the pressure of the fluid to drive a rotor in a stator housing. The output of the motor is eccentric, with the output shaft rotating about a circle as well as rotating about its axis. In order to limit the stress on the drill string and bit, one or more universal joints are installed as part of the drill string. The universal joint transmits the torque to the drill bit and converts the eccentric rotational component to axial rotation.

Figure 1:
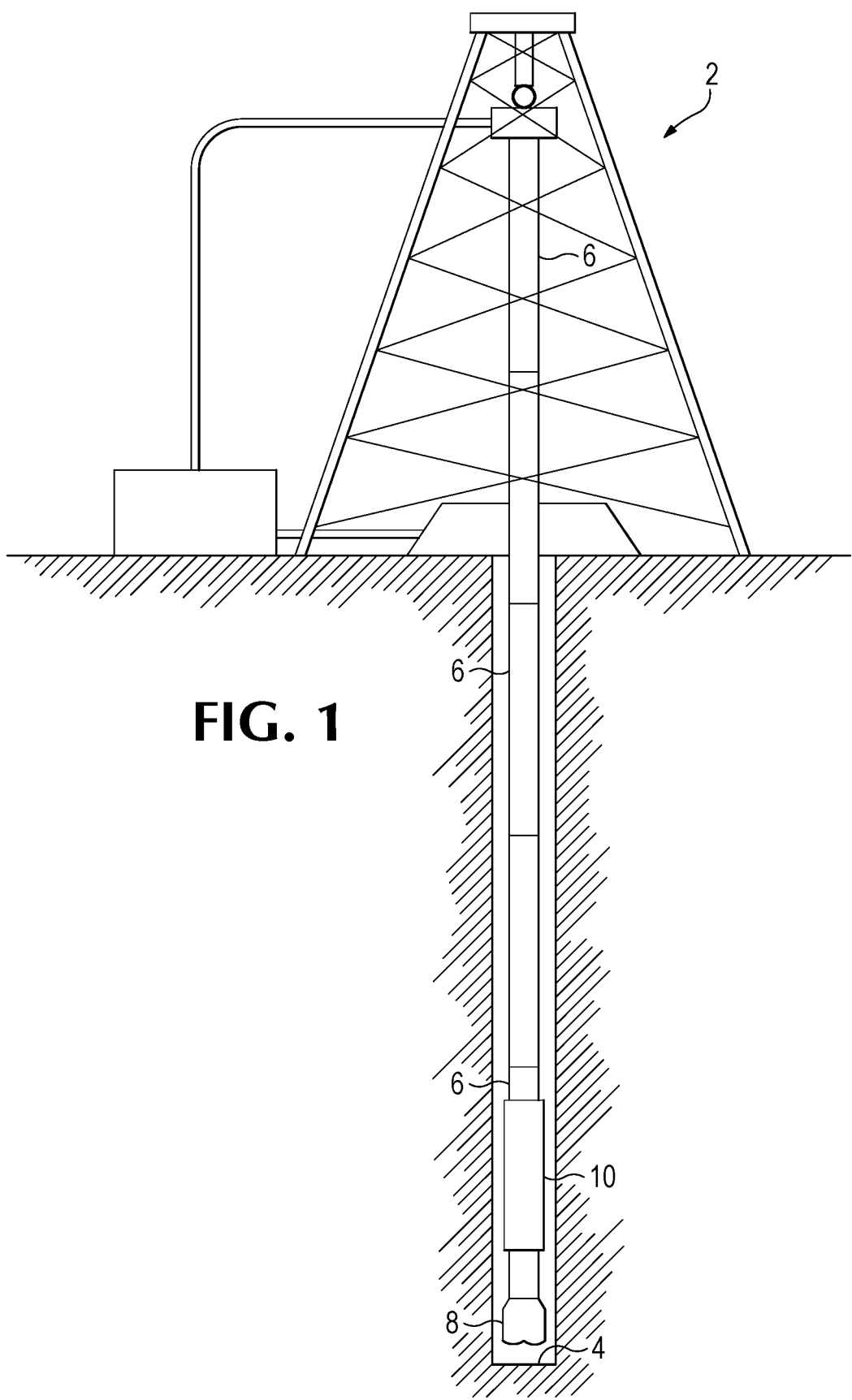
FIG. 1 is a schematic diagram of a drilling operation.
Figure 2:
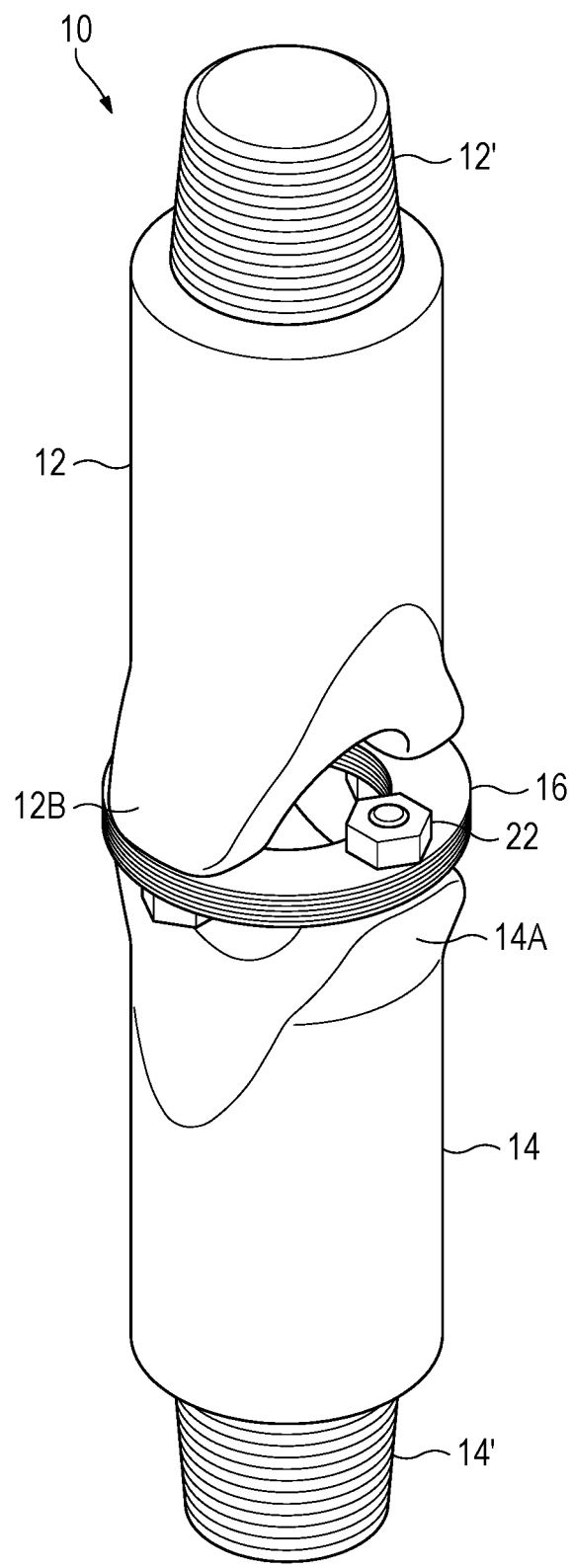
FIG. 2 is a perspective view of an inventive universal joint.

Different embodiments of universal joints in accordance with the invention are shown in FIGS. 2-9. The universal joint can transmit significant torque and compensate for misalignment of transmitting and receiving elements. Although the universal joint is discussed in relation to a mud motor and bit, the joint can be used in any downhole rotating application.

The disclosed universal joint assembly 10 includes a top or upper joint member 12 and a bottom or lower joint member 14 each with a longitudinal axis LA1 and LA2. Top member 12 preferably has a connector 12' at one end for joining to drill string components and axially extending arms 12A and 12B at the opposite end spaced from the connector. Arms 12A and 12B are spaced from each other and form a recess 24 between them. Bottom member 14 has a corresponding construction with a body and a connector 14' at one end and arms 14A and 14B at the opposite end spaced from the connector and from each other to form a recess 26 between them. This gives each of the joint members 12, 14 a slotted end that connects to bearing element 16. Top and bottom members 12 and 14 are shown as identical but could have different constructions. Each element is shown with two arms, but each element could have three, four or more arms. Arms are not necessary, i.e. the connections to the bearing element could be done in different ways without arms.

In the illustrated embodiment, each arm of each member includes a bolt or stud 18A, 18B, 20A and 20B that extends generally parallel to the longitudinal axis from the end of the respective arm. The top and bottom members 12 and 14 assemble to a bearing element 16. The studs at the ends of the arms pass through holes 28A, 28B, 30A, 30B of the bearing element. The holes are radially spaced from the center of the bearing element, and angularly spaced from each other in the plane of the bearing element 16. In this example, the holes are arranged at a 90 degree offset from each other, i.e., considering the angle between two radial lines extending from the center of the bearing member and passing through each adjacent hole. The angular spacing could be different. Moreover, while the radial and angular spacing of the holes are preferably uniform, one or both could vary from stud to stud.

Threaded studs and retainers 22 are shown in the examples, but other methods may be used to connect the upper and lower members 12 and 14 to the bearing element 16. For example, rivets, push on fasteners, swaged pins or welded connections could be used instead.

The bearing element carries the torque load through the joint and can transmit axial loads. Bearing element 16 preferably includes one or more disks, but other bearing elements could be used. The disks are shown as uniform and round, but they could be non-uniform (e.g., in shape, thickness, materials, etc.) and/or have a shape other than round. The arms are maintained in a generally spaced relationship on opposite sides of the disk. The spacing of the connection holes in bearing element 16 allows the bearing element to deflect and/or flex so the upper and lower members can move in relation to each other. The upper member generally rotates in relation to the lower member about the axis of the lower member and about a point near the center of the bearing element. Rotation can be measured as the angular deflection "β" of the longitudinal axis LA1 of the upper member in relation to the longitudinal axis LA2 of the lower member. The upper member can also move with axis LA1 making an angular deflection "Θ" about the axis LA2. In a typical application, the angle β can be constant and the angle Θ sweeps zero to 360 degrees.

Material used for the bearing element is matched to the expected flexural forces, torque and axial force expected in the application. The bearing element material can be one or more material selected from the group of metals, polymers or ceramics and can includes steel, copper alloys, nylon or other materials. The bearing element can consist of multiple stacked disks. The bearing element can be a hybrid construction such as metallic elements embedded in an elastomer. The bearing element can be discs in a sleeve of elastomer material. The sleeve may contain the disc or discs and a lubricant.

The maximum angular deflection is a function of the material properties of the bearing element. For bearing elements of metal, the maximum deflection is generally less than the point of plastic deflection where the bearing material takes a permanent set and the material work hardens.

Angular deflection of upper member 12 in relation to the lower member 14 causes bearing element 16 to flex to accommodate the displacement of the arms 12A and 12B in relation to the arms 14A and 14B. Bearing element 16 deflects primarily in the radial portion between holes 28 and 30. A hole 16' in the bearing element can increase the flexibility of the bearing element, but is not required. Where a hole is used, the hole can be square, triangular, round or other shape. A plurality of holes can also be used. Each portion of the bearing element in a rotating application generally flexes through a sinusoidal deflection with each rotation. The bearing element can optionally include relief slots configured to limit stress or fatigue failure in the bearing element.

FIGS. 5 and 6 show an alternative embodiment of a universal joint with features that tend to isolate bearing element 16 from axial force applied to the joint. A first bearing seat 124 extends from top member 12 between arms 12A and 12B. A second bearing seat 126 extends from bottom member 14 between arms 14A and 14B. An axial bearing element 128 shown as a ball bearing is positioned between the bearing seats so that when the top and bottom members are assembled to bearing element 16 the ball bearing is retained by the bearing seats on opposite sides.

Axial force applied to the universal joint is transmitted primarily through the bearing seats and the ball bearing. The bearing seats can be concave and curved to better retain the ball bearing and to increase the contact surface area between the seats and the ball.

The seat and the ball bearing concentrate the axial force at the contact faces. The bearing seats can be a different material than the top and bottom members. Both the seat and the ball bearing are preferably made of very hard materials to keep from deforming at the contact points and to limit erosion and spalling from the high normal forces. As examples, material used for seats and ball bearings can include chrome steel, stainless steel and ceramics such as silicon nitride. The seats may also be a hybrid material with a body of softer metal and a surface that contacts the ball bearing of the much harder material.

Other embodiments for transmitting axial force alone or in combination with bearing element 16 can be used and still fall within the scope of this disclosure. The ball bearing and bearing surfaces are used as an example for illustration.

FIG. 9 is a cross section view of an alternative embodiment of the invention. The universal joint includes an upper member 12, lower member 14, a disk 16 retained by bolts such as 20A and an axial bearing element 128 as a ball bearing. The disk 16 can consist of several stacked disks 136 with shims 136A separating each disk to limit contact and abrasion between disks. A compression spacer 138 at the top and bottom of disk 16 is a wedge shaped member to allow unimpeded flexure of the disk. The compression spacer can be a metal such as steel or brass or a resilient material such as an elastomer.

The components can be protected from abrasive fluids by a sleeve 132 sealing tightly over a portion of each of the upper and lower members. The sleeve is a flexible material such as an elastomer that allows the components to move relative to each other while remaining separate from drilling fluid. The sleeved portion can be filled with a nonabrasive fluid such as lubricating oil to offset pressure of the drilling fluid.

In this embodiment a bushing 134 limits contact between the bolt and the disk. The bushing can be a metal such as steel or can be a resilient material such as rubber or an elastomer that deflects under force. The bushing absorbs a portion of the flexure of the disk and can limit transfer of non-axial forces from the disk to the bolt such as shear and/or bending which can limit fatigue failures and extend service life of the bolt.

Where the universal joint is not sealed from the drilling fluid, portions of the joint may experience accelerated erosion from impingement of the abrasive fluid. The topmost disk can be a shield 140 of a harder wear resistant material such as a hard metal or a ceramic to absorb impingement of the abrasive fluid and limit erosion of the balance of the disks. Alternatively the shield 140 can be spaced from the disks at a position to deflect flow of the abrasive drilling fluid and limit erosion of components of the joint. The shield can be a sacrificial component that is preferentially eroded extending the service life of the other components.

In downhole applications, the forces experienced by the bearing member are not always predictable. Where the bearing element experiences more extreme flexure or axial force or more wear than expected, the service life can be shorter than predicted. Early failure of the component can require unplanned extraction of the drill string from the hole incurring substantial expense.

The bearing element 16 of universal joint 10 can include a service life indicator (SLI) that displays a gauge of remaining service life for the component. The indicator can allow the operator to replace the universal joint before a downhole failure.

For example the fatigue indicator disk can be selected to have a service life 80% of the life of the bearing element. Reduced service life of the fatigue indicator may be a factor of accelerated work hardening of the material or a harder material compared to the balance of the disks of the bearing element. At 80% of the service life the wear indicator can develop visible failure mechanisms such as cracking or other visible indicia that can be detected by the operator.

In one embodiment the service life indicator is a fatigue indicator. The fatigue indicator can be a disk 16B integrated with disks 16A of the bearing element 16 to flex with the bearing element in service as shown in FIG. 5. The fatigue indicator disk 16B can be a material selected to have a more limited service life than the bearing element. The universal joint or the bearing element can be removed from service in response to visual inspection of the fatigue indicator before the bearing element fails.

Components of a drill string are in contact with suspended particles of the drilling fluid that are abrasive and can erode the components. Components that have sliding contact with high normal forces are especially subject to erosion as the suspended particles between the sliding components accelerate erosion of the surfaces. Where the bearing element includes multiple disks stacked together, flexure of the bearing element causes the adjacent disks to cyclically slide against each other over a small distance. Particles between the disks abrade the adjacent surfaces. In one embodiment, the service life indicator is a wear or erosion indicator. The wear indicator can include a disk 16B included in the bearing element stack thinner than adjacent disks in FIG. 5. Erosion of the disk 16B to a critical thickness can be detected by the operator.

Alternatively, the erosion indicator can be a similar thickness to adjacent disks but of a material that erodes at a higher rate than adjacent disks. Alternatively, a fatigue, wear or erosion indicator could take the form of a bolt or rivet that passes axially through the bearing element 16. The wear indicator in this embodiment is subject to stresses as the bearing element operates and is configured to fail before the bearing element in a manner that separates at least a portion of the wear or erosion indicator from the bearing element allowing the operator to replace the joint or joint elements in response to inspection of the indicator.

The bearing element 16 of universal joint 10 can include an overstress indicator. In some applications, the joint may be subject to forces in excess of the specified operating range for the component that can damage and significantly reduce the service life of the component. For example, where the drill string experiences stick slip conditions, the bit can seize in the borehole subjecting the joint to excess torque. In one embodiment of an overstress indicator shown in FIG. 6, bearing element 16 comprises a stack of disks 16C and 16D. Each disk of the bearing element has one opposite pair of holes 28C and 28D and one opposite pair of slots 30C and 30D.

The one or more disks 16D are arranged with the holes and slots of the disks aligned. The holes of disk 16C are aligned to the slots of disks 16D. When assembled to the studs 18A, 18B, 20A, 20B extending from the arms of the elements, the pins are positioned spaced from the ends of the slots. The retainer 22 attached to the stud is torqued to a specification limit so that the stud will not shift in the slot below a specified amount of torque applied to the joint. If in operation the joint experiences torque above the specified torque, the pin shifts in the hole. Alignment marks 46A on the bearing element and/or the arm can indicate that the stud has shifted in the hole and the joint has been subject to excess torque.

Alternatively, the bearing element comprises a disk stack similar to FIG. 6 with at least one disk 16C fixed to adjacent disk 16D with a rupture strength at the torque specification of the joint. If the joint is subject to torque in excess of the specification, the indicator disk will separate from the adjacent adhered disk and rotate until the stud contacts the slot end wall in the balance of the disks. Misalignment of position indicators 46A on the edge of the disks can display the displacement of the indicator disk in relation to the balance of the disks.

Alternatively, the slots of the above embodiments are partially filled with a glass, ceramic or other material that fractures at a specified load. The studs can bear on the filler material in the slots during normal operation. Where the joint is overstressed, the stud bears on the filler material in the slot and exceeds the fracture strength of the filler material displacing the filler material so that the pin slides in the slot to a new position. A position indicator can then visibly indicate the displacement of the components.

While examples of service life indicators and overstress indicators have been presented, these indicators can take on other configurations and operate in different ways than those shown and still fall within the scope of this disclosure. These embodiments are presented for the purpose of illustration.

The universal joint in operation is part of a drill string. At times, the assembly is extracted from the well bore. When tension is applied to the universal joint at the upper member, the bearing element maintains a connection between the upper and lower members without additional retention features required on certain previous universal joints.

The universal joint disclosed above is inexpensive to manufacture and is durable with limited erosion and wear susceptibility. The joint can include service life indicators that allow the operator to replace the unit before operational failure.

It should be appreciated that although selected embodiments of the representative universal joints are disclosed herein, numerous variations of these embodiments may be envisioned by one of ordinary skill that do not deviate from the scope of the present disclosure. The disclosure set forth herein encompasses multiple distinct inventions with independent utility. The various features of the invention described above are preferably included in each universal joint. Nevertheless, the features can be used individually in a joint to obtain some benefits of the invention. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. While components are referred to as upper and lower, this is for the purpose of illustration. Orientations can be reversed to perform similar functions and still fall within the scope of the disclosure.

The invention claimed is:

1. A universal joint assembly comprising:
    a disk-shaped bearing element with opposite sides, and
    two joint members connected to the bearing element at radially and angularly spaced positions to transmit torque with a joint member extending from each of the opposite sides of the bearing element;
    wherein each joint member has an axis of rotation, a connector for joining to drill string components, and axially extending arms on an end opposite the connector with a recess between them,
    wherein the bearing element further comprises a plurality of discs in an elastomer sleeve,
    wherein the material of each disc of the plurality of discs comprises steel, copper alloys, nylon, ceramics, or combinations thereof, is configured to support a fixed non-zero angle of deflection between the axis of rotation of each joint member, and
    wherein the axially extending arms of the two joint members connect to a periphery of the bearing element at radially and angularly spaced positions for transmitting torque between the joint members and are parallel to each and to the axis of rotation.

2. The universal joint assembly of claim 1 where the bearing element is generally flat.

3. The universal joint assembly of claim 1 where the bearing element includes a shim between an adjacent pair of the disks.

4. The universal joint assembly of claim 1 where the bearing element further includes slots and holes, wherein the holes and the slots have different shapes.

5. The universal joint assembly of claim 1 including a second bearing element between but separate from the joint members, and where each joint member includes a seat to contact the second bearing element on opposite sides to transfer axial force through the joint assembly.

6. The universal joint assembly of claim 5 where the second bearing element is a ball bearing.

7. An assembly to transfer loads between a mud motor and a bit comprising:
    a mud motor and a bit; and
    the universal joint assembly of claim 1.

8. The assembly of claim 7 where the universal joint assembly comprises a ball bearing.

9. The assembly of claim 8 where the ball bearing has less than half the width of each joint member and the two joint members contact opposite sides of the ball.

10. The assembly of claim 7, wherein the two joint members each have ends that are each slotted to define the at least two axially extending arms.

11. The universal joint assembly of claim 1, wherein the two joint members each have ends that are each slotted to define the at least two axially extending arms.

12. The universal joint assembly of claim 1, wherein the disk-shaped bearing element has defined through it a plurality of holes formed at angularly spaced positions, and each of the axially extending arms has an end adjacent to the disk-shaped bearing element, to which is a stud is attached that extends through the holes in the bearing element.

13. The universal joint assembly of claim 1, wherein each of the plurality of discs includes an alignment mark therein.

14. The universal joint assembly of claim 1, wherein the bearing element further comprises a lubricant.

15. A joint assembly to transfer torque in a downhole drill string comprising:
    first and second bodies having adjacent ends with at least two axially extending connection portions, wherein the axially extending connection portions of each of the bodies form a recess between them, and wherein the axially extending connection portions having connectors extending therefrom that are parallel to each other and to the axis of rotation of each body;

at least one disk that is coupled to the connectors extending from the connection portions of each of the slotted ends on opposite sides at radially and angularly spaced positions so a portion of the at least one disk extends between connection portions of the bodies; and a fatigue indicator disk having a reduced service life relative to the at least one disk;

wherein the at least one disk is configured to support a fixed non-zero angle of deflection between the axis of rotation of the first body and the axis of rotation of the second body.

16. The joint assembly of claim 15 where the at least one disk flexes between the connection portions to absorb misalignment of the first and second bodies.

17. The joint assembly of claim 15 where the at least one disk includes openings at spaced positions, and studs on the slotted ends of the first and second bodies pass through openings in the at least one disk.

18. The joint assembly of claim 17 where the openings are slots and over-torque of the joint is indicated by relative radial movement of the studs in the slots.

19. The joint assembly of claim 17 including openings in the at least one disk, bushings received in the openings, and fasteners in the bushings to couple the bodies to the at least one disk.

20. The joint assembly of claim 15, wherein the fatigue indicator disk has a service life that is about 80% of the service life of the at least one disk.

21. A universal joint assembly of a drill string comprising:

a disk-shaped bearing element with opposite sides with a plurality of holes formed through it at angularly spaced positions;

two joint members connected to the disk-shaped bearing element at angularly spaced positions, the joint members configured to transmit torque with one joint member extending from each of the opposite sides of the disk-shaped bearing element; and a ball-shaped bearing element between the two joint members, the ball-shaped bearing element comprising chrome steel, stainless steel, or ceramic, wherein the disk-shaped bearing element comprises a plurality of disks in an elastomer sleeve, the material of each disc of the plurality of disks comprises steel, copper alloys, nylon, ceramics, or combinations thereof, wherein the disk-shaped bearing element further comprises a fatigue indicator disk having a reduced service life relative to the plurality of disks, wherein each joint member has a connector at one end for joining to drill string components, an axis of rotation, and axially extending arms with a recess between them that are substantially parallel to each other and the axis of rotation where they join the disk-shaped bearing element, each arm including a stud that extends from the arm and extends through one of the plurality of holes in the disk-shaped bearing element to connect the axially extending arm to a periphery of the bearing element at radially and angularly spaced positions for transmitting torque between the joint members, and wherein the disk-shaped bearing element is configured to support a fixed non-zero angle of deflection between the axis of rotation of each joint member.

22. The universal joint assembly of claim 21 further comprising a sleeve sealing to the two joint members.

23. The universal joint assembly of claim 21, further comprising an overstress indicator.

24. The universal joint assembly of claim 21, wherein the disk-shaped bearing element further comprises a lubricant.

* * * * *